March 18, 1930.  D. B. COOK  1,751,074

ROAD VEHICLE

Filed July 14, 1928

INVENTOR.
DAVID B. COOK
BY
ATTORNEYS.

Patented Mar. 18, 1930

1,751,074

UNITED STATES PATENT OFFICE

DAVID B. COOK, OF FRANKFORT, NEW YORK, ASSIGNOR TO ACME ROAD MACHINERY COMPANY, OF FRANKFORT, NEW YORK, A CORPORATION OF NEW YORK

ROAD VEHICLE

Application filed July 14, 1928. Serial No. 292,796.

In the operation of road working machines, such as road graders, rollers, crushing and screening plants and snow plows, it is frequently necessary for the machines to be so driven that one of the rear or traction wheels or crawlers thereof runs along at the side of the road or in the gutter where the soil is likely to be so moist and soft as not to provide a suitable traction surface, while the other traction device remains on a firm surface. When this occurs in the case of machines that are driven by an internal combustion engine through a differential or compensating gearing, the traction device at the side of the road is liable to spin idly, while the other traction device remains stationary on the firmer traction surface.

The principal object of the present invention is to provide means whereby differential movement of the traction devices may be prevented, so that in case suitable traction surface is not provided for one of the devices the other device may be caused to rotate and thus propel the machine.

Another object of the present invention is to provide such means which is controllable from the driver's seat and during the operation of the machine.

Still another object of the invention is to provide a power driven vehicle having means of the character indicated which is of simple, strong and durable construction, and easily and conveniently operated or controlled.

The several features of the invention, whereby these and other objects may be attained, will be clearly understood from the following description and accompanying drawings, in which.

Figure 1:
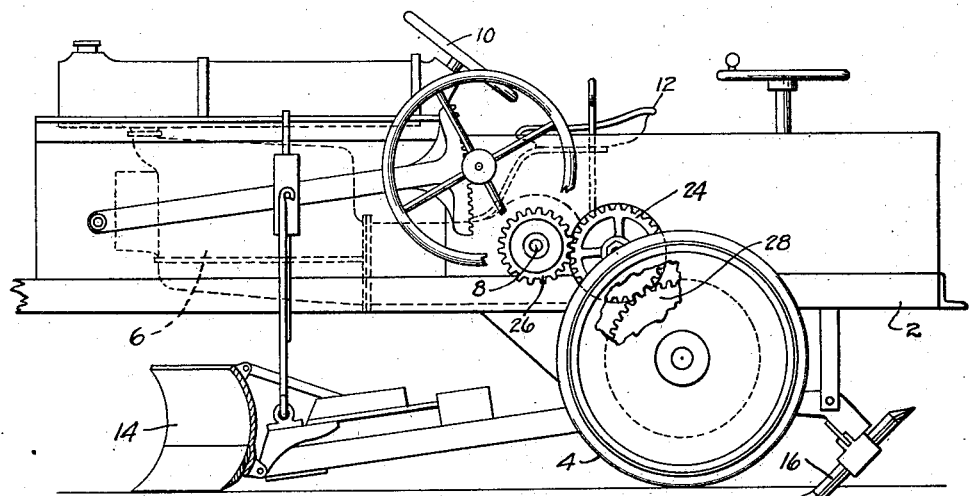
Figure 1 is a side view of the rear portion of a power driven road grader embodying the features of my invention in their preferred form.
Figure 2:
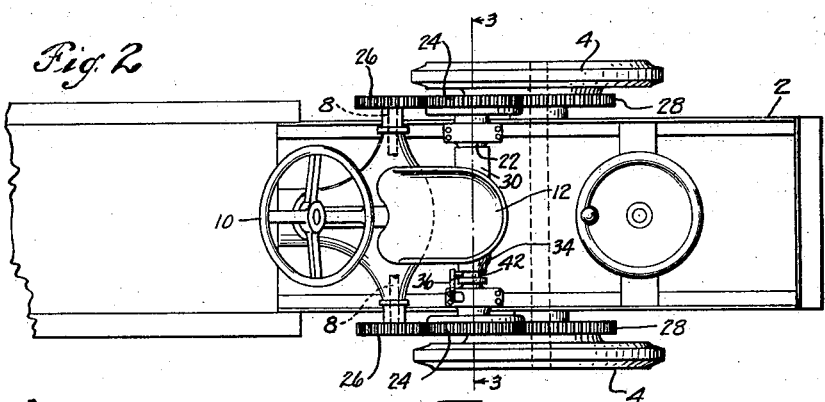
Fig. 2 is a plan view of the same.
Figure 3:
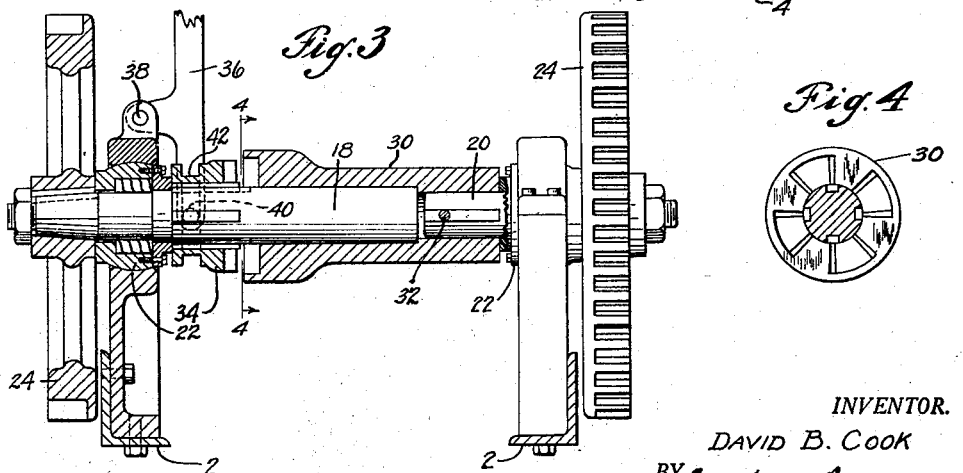
Fig. 3 is a detail transverse sectional view on an enlarged scale and partly in elevation, taken on the line 3—3 of Fig. 2.
Figure 4:
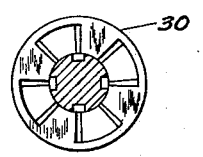
Fig. 4 is a detail sectional view taken on the line 4—4 of Fig. 3.

The road grader illustrated in the drawings is provided with the usual frame or chassis 2, rear driving or traction wheels 4, a power unit comprising an internal combustion engine 6 and differential driven shafts 8 which are in driving connection with the rear wheels 4, a steering wheel 10, driver's seat 12, grading blade 14 and a scarifier 16.

In accordance with my invention, a countershaft which is made in sections 18 and 20, arranged end to end, is mounted in suitable bearings 22 on the longitudinal side frames of the machine. The opposite ends of this divided countershaft carries gears 24 which are operatively engaged by gears or pinions 26 secured on the ends of the differentially driven shafts 8, and also are in driving engagement with gears 28 that are secured on the hubs of the rear driving wheels 4. As shown, means is provided for locking the two sections of the countershaft together. This means comprises a clutch sleeve 30 which surrounds the inner ends of the shaft sections, and is secured to the shaft section 20 by means of a pin 32. A clutch collar 34 is keyed on the shaft section 18 and is adapted to be shifted so as to bring a clutch face thereon into locking engagement with a clutch face on the clutch sleeve 30. The clutch collar 34 is adapted to be thus shifted by means of a hand operable lever 36 pivoted at 38 on the frame and provided with a shifting pin or stud 40 which is received in an annular groove 42 in the clutch collar. The upper end of the lever 36 is conveniently accessible from the driver's seat 12.

With this construction, it will be apparent that in case suitable traction surface is not provided for one of the driving wheels during the operation of the machine, the operator by means of the clutch lever 36 may shift the clutch collar 34 into operative engagement with the clutch member 30 and thus lock the two sections of the countershaft together. When this occurs, positive driving connection is established between the power unit and the two traction wheels 4. When both traction wheels are on firm ground or in turning a corner, the operator may shift the clutch lever 36 to disconnect the two sections of the countershaft and thus render the differential or compensating gearing of the power unit operative in the usual manner to drive the traction wheels.

Instead of mounting the clutch members 30 and 34 on the countershaft 18—20, it will be apparent that they may be mounted on the rear axle so as to directly connect the rear wheels. Also, in place of the rear wheels, other traction devices such as crawlers may be used. It will also be apparent to those skilled in the art that my invention permits various other modifications to be made without departing from the spirit thereof or the scope of the appended claim.

What I claim is:

A power driven vehicle having, in combination, traction devices, differentially driven shafts, connections between said shafts and wheels, respectively, for driving said devices differentially, comprising gears secured on the ends of said shafts, idler gears operatively engaged by said first-mentioned gears, gears for driving said devices and operatively engaged by said idler gears, and means comprising a clutch interposed between said idler gears and operable from the driver's seat for locking said idler gears together to prevent differential movement of said traction devices but permitting them to be driven simultaneously by said connections.

In testimony whereof, I have signed my name to this specification this 11 day of July, 1928.

DAVID B. COOK.